(12) United States Patent
Appleton

(10) Patent No.: US 6,325,122 B1
(45) Date of Patent: Dec. 4, 2001

(54) TRACTION DEVICE FOR VEHICLE TIRE

(76) Inventor: Robert Patrick Appleton, Glenburn House, Toranveen-By-Banchory, Mr Torphins, Aberdeenshire, AB31 4NY Scotland (GB)

( * ) Notice: Subject to any disclaimer, the term of this patent is extended or adjusted under 35 U.S.C. 154(b) by 0 days.

(21) Appl. No.: 09/485,922
(22) PCT Filed: Aug. 19, 1997
(86) PCT No.: PCT/GB97/02234
§ 371 Date: May 12, 2000
§ 102(e) Date: May 12, 2000
(87) PCT Pub. No.: WO99/08888
PCT Pub. Date: Feb. 25, 1999

(51) Int. Cl.[7] .................................................. B60C 27/10
(52) U.S. Cl. ............................ 152/175; 152/187; 152/219
(58) Field of Search .................................. 152/185, 185.1, 152/213 R, 213 A, 217, 219, 170, 173, 175, 187; 305/6, 7, 19

(56) References Cited

U.S. PATENT DOCUMENTS

| | | | |
|---|---|---|---|
| 2,365,279 | * 12/1944 | Kraft . | |
| 3,797,549 | * 3/1974 | Lieberum . | |
| 4,508,151 | * 4/1985 | Sepheriades et al. | ........... 152/213 A |
| 4,733,705 | * 3/1988 | Dwiggins | ........................ 152/185.1 |
| 5,170,827 | * 12/1992 | Urleb et al. | ........................ 152/221 |

* cited by examiner

Primary Examiner—Russell D. Stormer

(57) ABSTRACT

A traction device, preferably formed of an elastomer material, has molded threads and is designed to encapsulate a tire of a vehicle. The traction device has a body with a pair of distal ends. At one of the ends a pair of metal hooks are pivotally mounted to a hinge pin. When the traction device is placed around the tire, the metal hooks engage a locking pin disposed on the other end of the body. A bladder is mounted to an inner surface of the body such that the bladder becomes sandwiched between the body and the tire. Tension and grip is applied to the traction device by inflating the bladder. Air is introduced via an air valve through a communication duct. Once mounted, the traction device essentially becomes an integral member of the vehicle tire, thereby enhancing the traction of the drive wheels.

17 Claims, 2 Drawing Sheets

TRACTION DEVICE FOR VEHICLE TIRE

TECHNICAL FIELD

This invention relates to a traction device for wheel drive vehicles.

BACKGROUND OF THE INVENTION

Wheel driven vehicles suffer major problems due to lack of traction from the drive wheels when snow, ice, and/or mud conditions are encountered. Even four wheel drive vehicles have difficulty handling slippery conditions, particularly with low profile treaded tires.

SUMMARY OF THE INVENTION

It is an object of the present invention to obviate or mitigate the aforementioned disadvantages in the prior art.

According to the first aspect of the present invention there is provided a traction device comprising a body capable of being placed in intimate contact with an outer surface of a tire and being retained thereupon by retaining means.

The body may comprise a flexible strip having first and second ends.

The retaining means may be provided at or near the first and second ends so as to retain the ends in association with one another.

The retaining means may comprise at least one hinged hook retained at one of the ends. The/each hook may be engageable with at least one pin.

An inflatable bladder may b e carried on an inner surface of the body.

The bladder may be retained at or near one of the ends of the body.

An outer surface of the device may carry tread and/or studs.

The body may be substantially formed from an elastomer/rubber.

The body may be reinforced with textile threads and/or metal strips/wires.

The body may also provide longitudinal wall portion(s), which, in use, intimately contacts wall(s) of the tire.

According to a second aspect of the present invention there is provided a tire having a traction device according to the first aspect fitted thereto.

According to a third aspect of the present invention there is provided a method of providing additional traction to a tire of a vehicle comprising the steps of:

providing a traction device according to the first aspect;
positioning the traction device adjacent the wheel;
driving the vehicle onto the device;
retaining the device around the tire by means of the retaining means; and
optionally inflating the bladder (when provided).

A traction device may be so fitted to each tire of the vehicle.

Alternatively a traction device may be so fitted to each driven wheel of the vehicle.

According to a fourth aspect of the present invention there is provided a molded elastomer shroud or body that encapsulates a vehicle drive tire, providing a greatly enhanced gripping profile that will provide far superior traction in slippery driving conditions.

The shroud or body consist s of an elastomer m ember that is shaped to follow the approximate contour of the vehicle tire.

The two ends of the body over lap and are fastened together by way of hinged metal hooks.

The body is tightened by means of an inflatable bladder incorporated between the body and the tire.

The bladder is inflated by way of an air valve intergated in one of the hinge pins that support the metal lock hooks.

The bladder can be inflated by means of an air pump, air bottle, or a jumper hose that will permit air to be transferred from the vehicle's air inflated tire, as only a small volume is required for full inflation to be achieved.

The tread or traction rib can be molded in various shapes to give the most advantageous performance, i.e. 'V' shaped, square shaped, and can also include metal studs particularly for dealing with icy surfaces.

The inner surface of the body (ie. that coming into contact with the tire), may be provided with a ribbed, or rough surface to prevent slippage between the two surfaces.

The body can be made to fit any type or size of tire.

Installation of the body is accomplished by simply driving onto the body, position the incorporated bladder beneath the overlap, and fold down the locking books over the locking pin.

Inflating the bladder with pressurized air, puts the locking hooks in tension and fixes the body to the tire to provide a high traction surface.

BRIEF DESCRIPTION OF THE DRAWINGS

An embodiment of the invention will now be described by way of example with reference to the accompanying drawings, in which.

DETAILED DESCRIPTION OF THE PREFERRED EMBODIMENT

Figure 1:
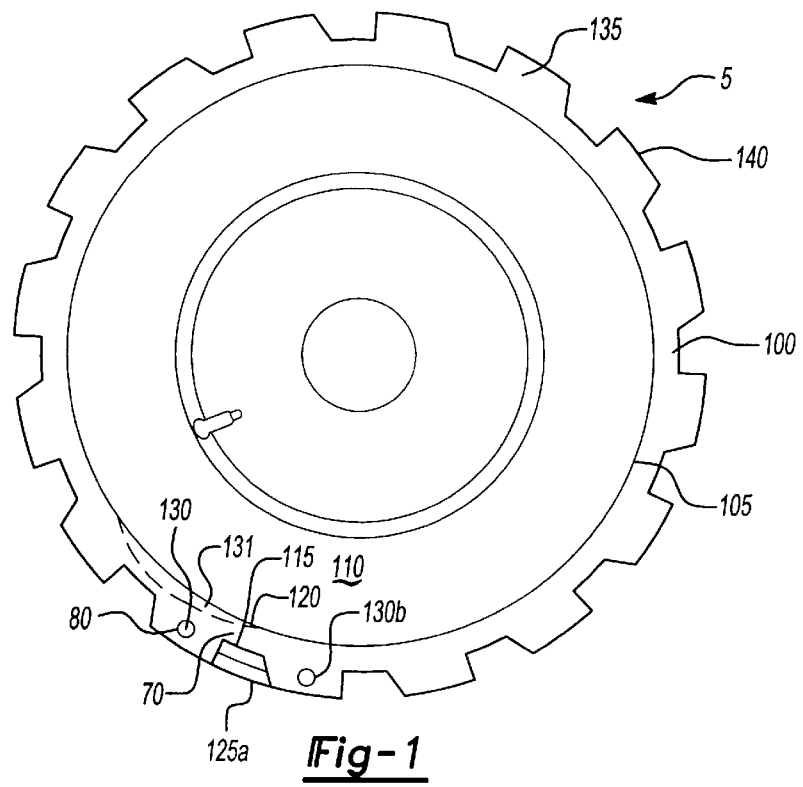
FIG. 1 shows a side view of a traction device according to an embodiment of the present invention mounted on a typical motor tire.
Figure 2:
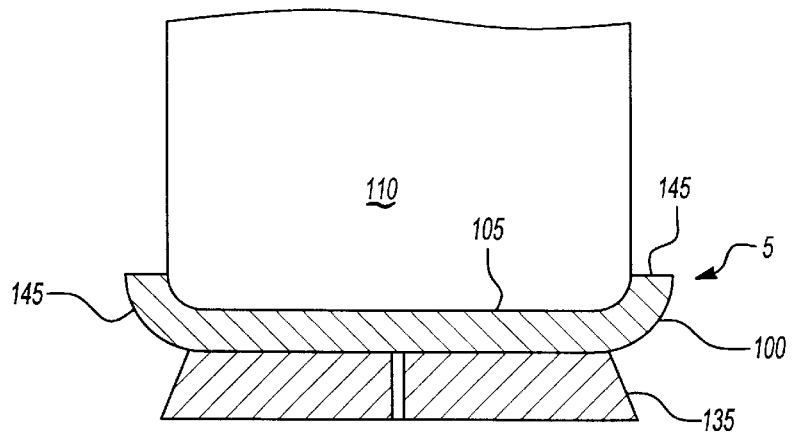
FIG. 2 shows a partial cross sectional end view of the traction device of FIG. 1 mounted on the motor tire.
Figure 3:
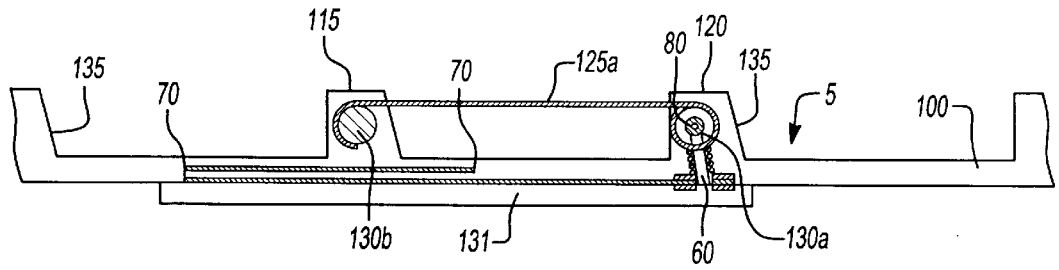
FIG. 3 shows an end view to an enlarged scale of a locking mechanism and inflatable bladder arrangement comprising part of the traction device of FIG. 1.
Figure 4:
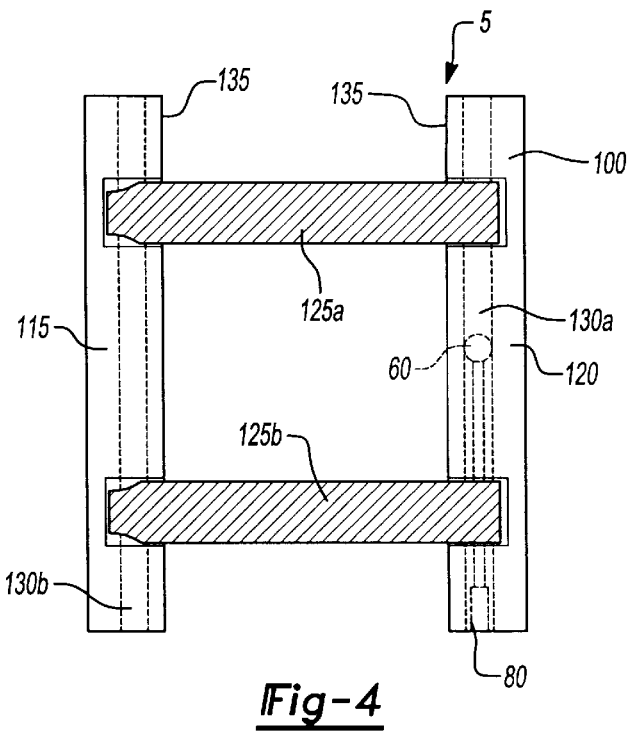
FIG. 4 shows a top view to an enlarged scale of the locking mechanism and an air valve arrangement of the traction device of FIG. 1.
Figure 5:
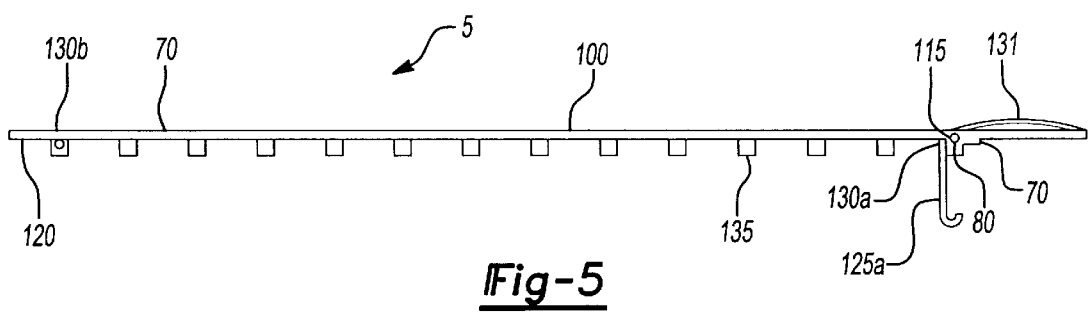
FIG. 5 shows a side view of the traction device of FIG. 1 prior to attachment to a vehicle tire.

Referring to FIGS. 1 to 5, there is illustrated a traction device, generally designated 5, according to an embodiment of the present invention.

The traction device 5 comprises a body or shroud 100 capable of being placed in intimate contact with an outer surface 105 of a wheel or tire 110 and being retained thereupon by retaining means. The body 100 comprises a flexible strip having first and second ends 115, 120.

The retaining means are provided at the first and second ends 115, 120 so as to retain the ends 115, 120 in association with one another. The retaining means comprise two hinged hooks 125a, 125b retained at one of the ends 115 and pivotable about a pin 130a. The/each hook 125a, 125b is releasably engageable with a pin 130b.

An inflatable bladder 131 is carried on an inner surface of the body 100. The bladder 131 is retained at or near one of the ends 115, 120 of the body 100.

An outer surface of the device 5 carries traction treads 135 and/or studs 140.

The body 100 is substantially formed from an elastomer/rubber and may be reinforced with textile threads and/or metal strips/wires.

In this embodiment the body 100 is provided with longitudinal wall portions 145, which, in use, intimately contacts side walls of the tire 110.

FIG. 1 shows the traction device 5 fitted to a tire 10 by means of a locking device, consisting of the two hinge pins 130*a*, 130*b* upon which are mounted the two metal hooks 125*a*, 125*b* for connecting both ends 115, 120 together at an over-lap point 70 of the body 100. Molded onto the surface of the body 100 are the traction treads 135 at substantially evenly spaced intervals. The last traction tread at either end has the hinge pins 130*a*, 130*b* molded or fitted into them. One of the hinge pins 130*a*, 130*b* is fitted with an air valve 80 that permits the passage of air to travel through an air duct 60 causing the inflatable bladder 131 to be inflated. This operation causes the traction device 5 to be put in tension against the metal hooks 125*a*, 125*b* and the tire 110. The tire 110, together with the tensioned traction device 5, now rotate as one. The traction device 5 is removed by releasing the air from the air valve 80 causing the bladder 131 to deflate. This permits the metal hooks 125*a*, 125*b* to be released, and the traction device 5 can be removed. The bladder 131 can be inflated by various means, some of which can be, pressurized air bottles, air pumps, a jumper hose with fittings to permit air to be transferred from the vehicle tire or tube, and passed into the traction device bladder.

In use, the traction device 5 can be fitted to a tire 110 of a vehicle by the steps of:

providing a traction device 5;

positioning the traction device 5 adjacent the tire 110;

driving the vehicle onto the device 5;

retaining the device 5 around the tire 110 by means of the retaining means; and optionally inflating the bladder 131.

The embodiment of the invention hereinbefore described is given by way of example only and is not meant to limit the scope of the invention in any way.

What is claimed is:

1. A method of providing additional traction to a tire of a vehicle comprising the steps of:

providing a traction device to be placed in intimate contact with an outer surface of a tire and retained thereon by a retaining means including first and second interengaging means provided at or adjacent first and second ends of a body and capable of retaining said ends in association with one another, wherein said retaining means includes an inflatable bladder carried on an outer surface of said body and which, in use, intimately contacts an outer surface of said wheel or tire;

driving said vehicle onto said device;

retaining said device around said wheel by means of said retaining means.

2. A traction device for contacting an outer surface of a tire, said traction device comprising;

a body having first and second ends and an inner surface, said body adapted to be placed in intimate contact with the outer surface of the tire, a retaining means for retaining said body on the tire, said retaining means including a first interengaging means mounted adjacent said first end of said body and a second interengaging means mounted adjacent said second end of said body for retaining said ends of said body in association with one another, said retaining means further including an inflatable bladder mounted to said inner surface of said body wherein said inflatable bladder intimately contacts the outer surface of the tire and is sandwiched between said body and the tire when said body is retained about the tire, said bladder being inflatable to tension said first and second interengaging means and securely mount said body to the tire.

3. A traction device as claimed in claim 2, wherein the body comprises a flexible strip.

4. A traction device as claimed in claim 2, wherein the first and second ends include respective overlapping portions which overlap one with the other, when in use.

5. A traction device as claimed in claim 2, wherein the retaining means provide at least one hinged hook retained at one of the ends of the body, said hook being engageable with the other end of the body.

6. A traction device as claimed in claim 2, wherein the bladder is provided at or near one of the ends of the body.

7. A traction device as claimed in claim 2, wherein the device includes an outer surface with tread or studs extending therefrom.

8. A traction device as claimed in claim 2, wherein the body is formed from an elastomer.

9. A traction device as claimed in claim 2, wherein the body is reinforced with textile threads and/or metal strips/wires.

10. A traction device as claimed in claim 2, wherein the body provides at least one longitudinal wall portion, which, in use, intimately contacts at least one wall of the tire.

11. A traction device as claimed in claim 2, wherein the body is further defined as a shroud to encapsulate a tire tread area, the interengaging means being capable of connecting both ends to each other so as to form a continuous surface including molded elastomer treads or ribs to provide traction or grip.

12. A traction device as claimed in claim 11, wherein the elastomer shroud fully covers the tire surface contact area, and a portion of the walls of the tire.

13. A traction device as claimed in claim 11, wherein the shroud supports molded treads or ribs which contain metal studs for additional grip.

14. A traction device as claimed in claim 11, wherein the retaining means includes the inflatable bladder positioned between the shroud and the vehicle tire, when in use.

15. A traction device as claimed in claim 11, wherein one hinge pin provides an air valve and communication duct for bladder inflation by air or gas.

16. A traction device as claimed in claim 11 wherein the shroud ends over-lap, and an inner surface thereof has a non slip or high friction surface.

17. A traction device as claimed in claim 11, wherein the inflatable bladder can be inflated by a gas through an air pump, a compressed air bottle, or transferred from the host tire.

* * * * *